United States Patent [19]

Sawasaki et al.

[11] Patent Number: 5,295,920

[45] Date of Patent: Mar. 22, 1994

[54] AUTOMATIC TRANSMISSION SYSTEM FOR VEHICLE

[75] Inventors: Tomoo Sawasaki; Shuichi Kawamura; Yuji Mori; Masako Kagawa, all of Hiroshima, Japan

[73] Assignee: Mazda Motor Corporation, Hiroshima, Japan

[21] Appl. No.: 984,512

[22] Filed: Dec. 2, 1992

[30] Foreign Application Priority Data

Dec. 4, 1991 [JP] Japan .................................. 3-320447
Mar. 31, 1992 [JP] Japan .................................. 4-077739

[51] Int. Cl.⁵ ............................................. F16H 9/20
[52] U.S. Cl. ................................... 475/210; 74/606 R
[58] Field of Search ............. 74/606 R; 475/200, 206, 475/210

[56] References Cited

U.S. PATENT DOCUMENTS

| 4,526,061 | 7/1985 | Sakakibara et al. | 475/206 X |
| 4,543,852 | 10/1985 | Svab et al. | 475/210 |
| 4,583,423 | 4/1986 | Hahne | 475/206 X |
| 4,608,885 | 9/1986 | Koivunen | 475/210 |

FOREIGN PATENT DOCUMENTS

| 57-173652 | 10/1982 | Japan . | |
| 1-112076 | 4/1989 | Japan . | |
| 3-72858 | 11/1991 | Japan . | |
| 2235261 | 2/1991 | United Kingdom | 475/210 |

Primary Examiner—Dirk Wright
Attorney, Agent, or Firm—Sixbey, Friedman, Leedom & Ferguson

[57] ABSTRACT

An automatic transmission system having a belt type infinitely variable gear is housed in a transmission casing. The transmission casing is formed of a torque convertor housing portion in which the torque convertor is housed and an infinitely variable gear housing portion in which the infinitely variable gear is housed. A forward-reverse switching mechanism is provided between the torque convertor and the primary shaft of the infinitely variable gear and is supported on the torque convertor housing portion. Opposite ends of the primary shaft of the infinitely variable gear are supported on support portions respectively formed on the infinitely variable gear housing portion and the torque convertor housing portion, and opposite ends of the secondary shaft of the infinitely variable gear are supported on support portions respectively formed on the infinitely variable gear housing portion and the torque convertor housing portion.

8 Claims, 7 Drawing Sheets

AUTOMATIC TRANSMISSION SYSTEM FOR VEHICLE

BACKGROUND OF THE INVENTION

1. Field of the Invention

This invention relates to an automatic transmission system for a vehicle.

2. Description of the Prior Art

There has been known a belt-type automatic transmission system for a vehicle having a torque convertor and an infinitely variable gear which comprises a primary pulley mounted on a primary shaft, a secondary pulley mounted on a secondary shaft parallel to the primary shaft and an endless belt passed around the primary and secondary pulleys and in which the transmission ratio is infinitely changed by changing the ratio of the effective diameter of the primary pulley to that of the secondary pulley. (See, for instance, Japanese Unexamined Patent Publication No. 1(1989)-112076)

In such a belt-type automatic transmission system, the output of the transmission must be transmitted to the wheels through a reduction gear having a large reduction ratio which is provided between the output shaft of the transmission and a differential. The automatic transmission system is generally housed in a casing comprising an infinitely variable gear housing portion in which the infinitely variable gear is housed and a torque convertor housing portion in which the torque convertor is housed. One end of the shaft of the reduction gear is supported for rotation on the infinitely variable gear housing portion by way of a bearing and the other end of the reduction gear shaft is supported for rotation on the torque convertor housing portion by way of a bearing. The infinitely variable gear housing portion and the torque convertor housing portion are positioned relative to each other based on a knock pin so that the bearings for supporting opposite ends of the reduction gear shaft are centered relative to each other.

However when the reduction gear shaft is supported in such a manner, the bearings for supporting opposite ends of the reduction gear shaft cannot be accurately centered relative to each other due to dimensional errors of the infinitely variable gear housing portion and the torque convertor housing portion and the like and the reduction gears cannot mesh with each other in a desirable manner, whereby gear noise is produced.

In Japanese Patent Publication No. 3(1991)-72858, there is disclosed a structure for supporting the primary and secondary shafts of the infinitely variable gear. In the structure, one end of the primary shaft which is connected to the torque convertor is supported on the torque convertor housing portion of the transmission casing and the other end of the primary shaft is supported on the infinitely variable gear housing portion. One end of the secondary shaft which is connected to the reduction gear is supported on the infinitely variable gear housing portion and the other end of the secondary shaft is supported on a partition wall member which is provided separately from the torque convertor housing portion and the infinitely variable gear housing portion. The partition wall member is disposed to separate the infinitely variable gear and the reduction gear from each other and is provided with a through hole through which the other end portion of the secondary shaft extends to be connected to the reduction gear. The other end of the secondary shaft is supported by a bearing provided in the through hole.

In the automatic transmission system disclosed in Japanese Unexamined Patent Publication No. 57(1982)-173652, a forward-reverse switching mechanism is carried by the secondary shaft of the infinitely variable gear.

In the conventional system described above, in order to rigidly incorporate the transmission casing, the partition wall member must be rigidly incorporated as well as the infinitely variable gear housing portion and the torque convertor housing portion. That is, the partition wall member is not only for separating a space but also for positioning and supporting in place the secondary shaft. Accordingly, the partition wall member must be rigidly incorporated with a substantial mounting accuracy, which adversely affects the incorporating facility of the transmission casing.

Further the partition wall member makes it difficult to incorporate the reduction gear to be disposed inside the partition wall member.

Further when the primary shaft and the secondary shaft are positioned to be parallel to each other, the positioning accuracy of the end of the secondary shaft on the side of the torque convertor housing portion is affected by the sum of the dimensional error of the torque convertor housing portion and the mounting error of the partition wall member and accordingly the secondary shaft cannot be positioned with a high accuracy relative to the primary shaft.

Further since the end of the secondary shaft is extended beyond the bearing provided in the partition wall member and a gear in mesh with a gear of the reduction gear is mounted on the extreme end of the secondary shaft, the end portion on the side of the reduction gear is supported by the bearing in a cantilever fashion. In such a state, it is difficult to stably support the reduction gear.

Further since the secondary shaft involves problems in incorporating facility and/or mounting accuracy as described above, it is difficult to position the forward-reverse switching mechanism with a high accuracy relative the parts to be associated therewith when the forward-reverse switching mechanism is mounted on the secondary shaft.

SUMMARY OF THE INVENTION

In view of the foregoing observations and description, the primary object of the present invention is to provide an automatic transmission system having an infinitely variable gear in which the bearings supporting opposite ends of the reduction gear can be precisely centered relative to each other.

Another object of the present invention is to provide an automatic transmission system having an infinitely variable gear in which the transmission casing can be easily incorporated, the secondary shaft can be easily and accurately incorporated, the secondary shaft can be stably supported and the forward-reverse switching mechanism can be positioned in a desirable manner.

In accordance with the present invention, the transmission casing comprises a torque convertor housing portion in which the torque convertor is housed and an infinitely variable gear housing portion in which the infinitely variable gear is housed. The forward-reverse switching mechanism is provided between the torque convertor and the primary shaft of the infinitely variable gear and is supported on the torque convertor housing portion. Opposite ends of the primary shaft of the infinitely variable gear are supported on support portions respectively formed on the infinitely variable gear housing portion and the torque convertor housing portion, and opposite ends of the secondary shaft of the infinitely variable gear are supported on support portions respectively formed on the infinitely variable gear housing portion and the torque convertor housing portion.

In an preferred embodiment of the present invention, one end of a reduction gear shaft for a reduction gear which reduces the speed of an output shaft of the infinitely variable gear is supported on a bearing cover disposed in the infinitely variable gear housing portion and the other end of the reduction gear shaft is supported on a support portion formed in the torque convertor housing portion. The bearing cover is formed separately from the infinitely variable gear housing portion and is positioned relative to the torque convertor housing portion by way of engagement of a pair of engaging portions which are respectively formed in the bearing cover and the torque convertor housing portion so that the bearing cover and the support potion are centered relative to each other when the engaging portions are engaged with each other.

DESCRIPTION OF THE PREFERRED EMBODIMENTS

Figure 1:
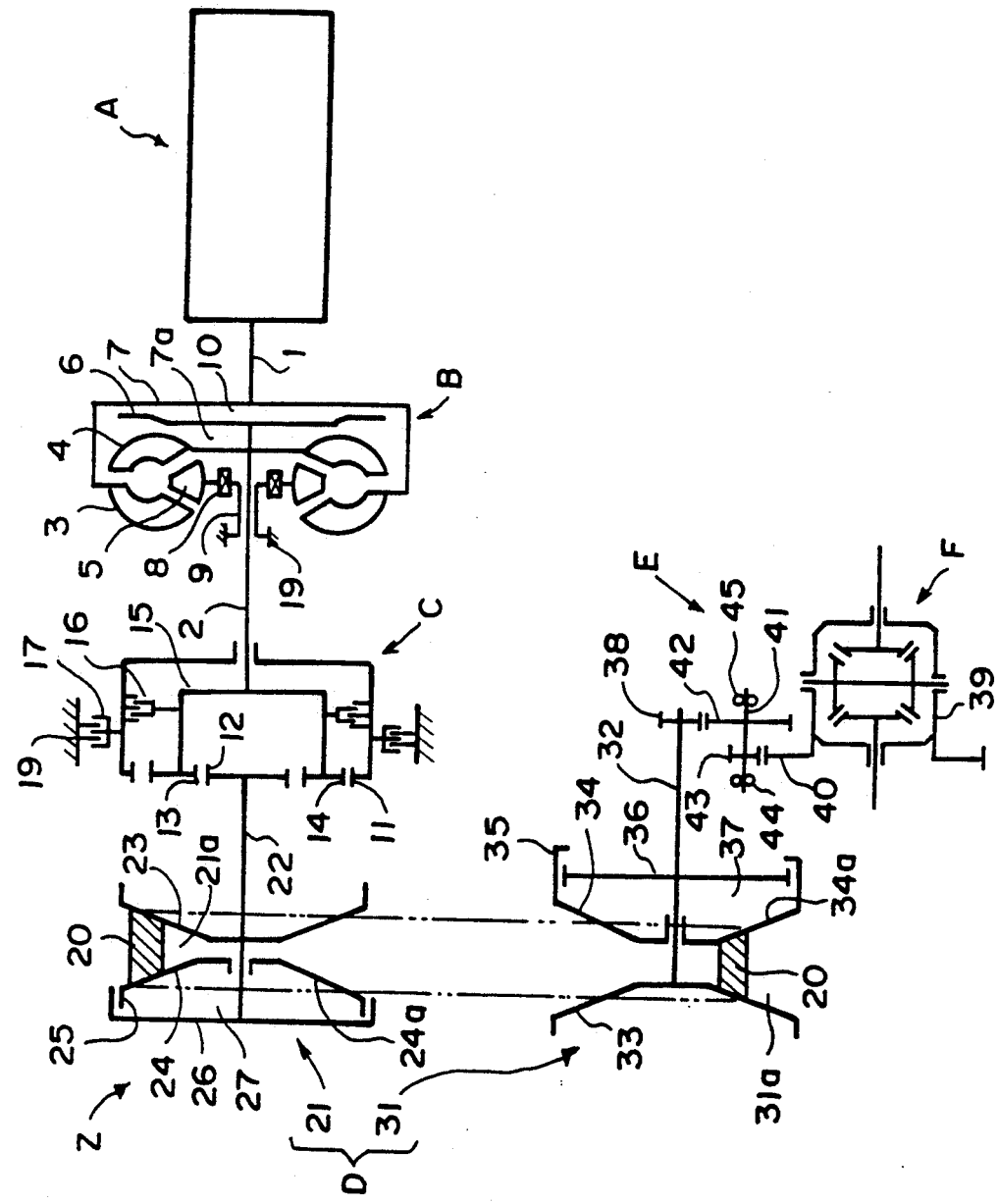
FIG. 1 is a schematic view showing an automatic transmission system, to which the present invention is applied.

In FIG. 1, an automatic transmission system Z in accordance with an embodiment of the present invention, which is for a front-drive vehicle, comprises a torque convertor B connected to an output shaft 1 of an engine A, a forward-reverse switching mechanism C, a belt type infinitely variable gear D, a reduction gear E and a differential F.

The torque convertor B comprises a pump impeller 3 which is fixed to one side of a pump cover 7 connected to the engine output shaft 1 and rotates integrally with the engine output shaft 1, a turbine runner 4 which is opposed to the pump impeller 3 inside the pump cover 7, and a stator 5 which is disposed between the pump impeller 3 and the turbine runner 4 and increases torque. The turbine runner 4 is connected to a carrier 15, which is an input member of the forward-reverse switching mechanism C, by way of a turbine shaft 2, and the stator 5 is connected to a transmission casing 19 by way of a one-way clutch 8 and a stator shaft 9.

A lockup clutch is disposed between the turbine runner 4 and the pump cover 7. The lockup clutch has a piston 6 which is connected to the turbine shaft 2 by way of splines so as to be movable in the axial direction of the turbine shaft 2. The piston 6 divides the space in the pump cover 7 into a convertor rear chamber 7a facing the impeller 3 and a convertor front chamber 10 facing the pump cover 7. When a hydraulic pressure is introduced into the convertor front chamber 10, the piston 6 is moved away from the pump cover 7 and the engine output is transmitted to the turbine shaft 2 through the torque convertor B, and when the hydraulic pressure is discharged from the convertor front chamber 10, the piston 6 is pressed against the pump cover 7 under the pressure in the convertor rear chamber 7a and the engine output is directly transmitted to the turbine shaft 2 (lockup).

The forward-reverse switching mechanism C which transmits rotation of the turbine shaft 2 to the infinitely variable gear D as it is or after reversing it comprises a double pinion planetary gear unit. That is, a first pinion 13 in mesh with a sun gear 12 and a second pinion 14 in mesh with a ring gear 11 are mounted on the carrier 15 which connected the turbine shaft 2 by way of splines. The sun gear 12 is connected to a primary shaft 22 of the infinitely variable gear D by way of splines.

A forward clutch 16 is disposed between the ring gear 11 and the carrier 15, and a reverse clutch (or a brake) 17 is disposed between the ring gear 11 and the transmission casing 19 and selectively holds stationary the ring gear 11 relative to the transmission casing 19.

In the state where the forward clutch 16 is engaged and the reverse clutch 17 is disengaged, the ring gear 11 and the carrier 15 are held stationary relative to each other and at the same time the ring gear 11 is rotatable relative to the transmission casing 19, and accordingly, rotation of the turbine shaft 2 is reversed by the first pinion 13 and the second pinion 14 and then transmitted to the primary shaft 22 through the sun gear 12. (reverse travel)

That is, in the forward-reverse switching mechanism C, forward and reverse travels are switched by selectively engaging and disengaging the forward clutch 16 and the reverse clutch 17.

The infinitely variable gear D comprises a primary pulley 21 disposed behind the forward-reverse switching mechanism C coaxially therewith, a secondary pulley 31 spaced from the primary pulley 21 and a belt 20 passed around the primary and secondary pulleys 21 and 31.

The primary pulley 21 comprises a stationary cone plate 23 of a predetermined diameter integrally provided on a primary shaft 22 which is connected to the sun gear 12 of the forward-reverse switching mechanism C by way of splines at one end thereof and a movable cone plate 24 which is movable in the axial direction of the primary shaft 22. The cone plates 23 and 24 have cone friction surfaces and a belt groove 21a having a V-shaped cross section is formed between the friction surfaces.

A cylindrical piston 25 is fixed to the outer surface 24a of the movable cone plate 24 and is received in an oil-tight fashion in a cylinder 26 which is fixed to the primary shaft 22. A primary hydraulic pressure chamber 27 is formed by the piston 25, the cylinder 26 and the movable cone plate 24. A hydraulic pressure is introduced into the primary hydraulic pressure chamber 27 by a hydraulic circuit which will be described later.

In the primary pulley 21, the space between the movable cone plate 24 and the stationary cone plate 23 is changed by moving the movable cone plate 24 in the axial direction of the primary shaft 22, thereby changing the effective radius of the primary pulley 21.

The secondary pulley 31 is basically the same as the primary pulley 21 in structure. That is, a stationary cone plate 33 is integrally provided on a secondary shaft 32 which is provided in parallel with the primary shaft 22 at a distance therefrom, and a movable cone plate 34 is provided on the secondary shaft 32 to be movable in the axial direction of the secondary shaft 32. The cone plates 33 and 34 have cone friction surfaces and a belt groove 31a having a V-shaped cross section is formed between the friction surfaces.

A cylinder 35 is fixed to the outer surface 34a of the movable cone plate 34 and a piston 36 fixed to the secondary shaft 32 is received in an oil-tight fashion in the cylinder 35. A secondary hydraulic pressure chamber 37 is formed by the piston 36, the cylinder 35 and the movable cone plate 34. A hydraulic pressure is introduced into the secondary hydraulic pressure chamber 37 by the hydraulic circuit which will be described later.

As in the primary pulley 21, the space between the movable cone plate 34 and the stationary cone plate 37 is changed by moving the movable cone plate 34 in the axial direction of the secondary shaft 32, thereby changing the effective radius of the secondary pulley 31. The pressure receiving area of the movable cone plate 34 of the secondary pulley 31 is smaller than that of the movable con plate 24 of the primary pulley 21.

The output torque of the engine A is transmitted to the infinitely variable gear D through the torque convertor B and the forward-reverse switching mechanism C.

In the infinitely variable gear D, the effective radius of the primary pulley 21 is adjusted by introduction or discharge of the working fluid into and from the primary hydraulic pressure chamber 27, and the effective radius of the secondary pulley 31 is adjusted following the primary pulley 21. The transmission ratio of the infinitely variable gear D is determined by the ratio of the effective radius of the primary pulley 21 to that of the secondary pulley 31.

The rotation of the secondary shaft 32 is reduced by the reduction gear E and then transmitted to the front axle through the differential F.

The reduction gear E comprises an input gear 38 fixed to the secondary shaft 32 of the infinitely variable gear D, an output gear 40 of a large diameter which is fixed to a differential casing 39 of the differential F and rotates about an axis parallel to the secondary shaft 32, and first and second reduction gears 42 and 43 provided on a reduction gear shaft 41 parallel to the secondary shaft 32. The first reduction gear 42 is in mesh with the input gear 38 and is larger than the same in diameter, and the second reduction gear 43 is in mesh with the output gear 40 having a large diameter and is smaller than the first reduction gear 42 in diameter. With this arrangement, a large reduction ratio can be obtained.

Figure 2:
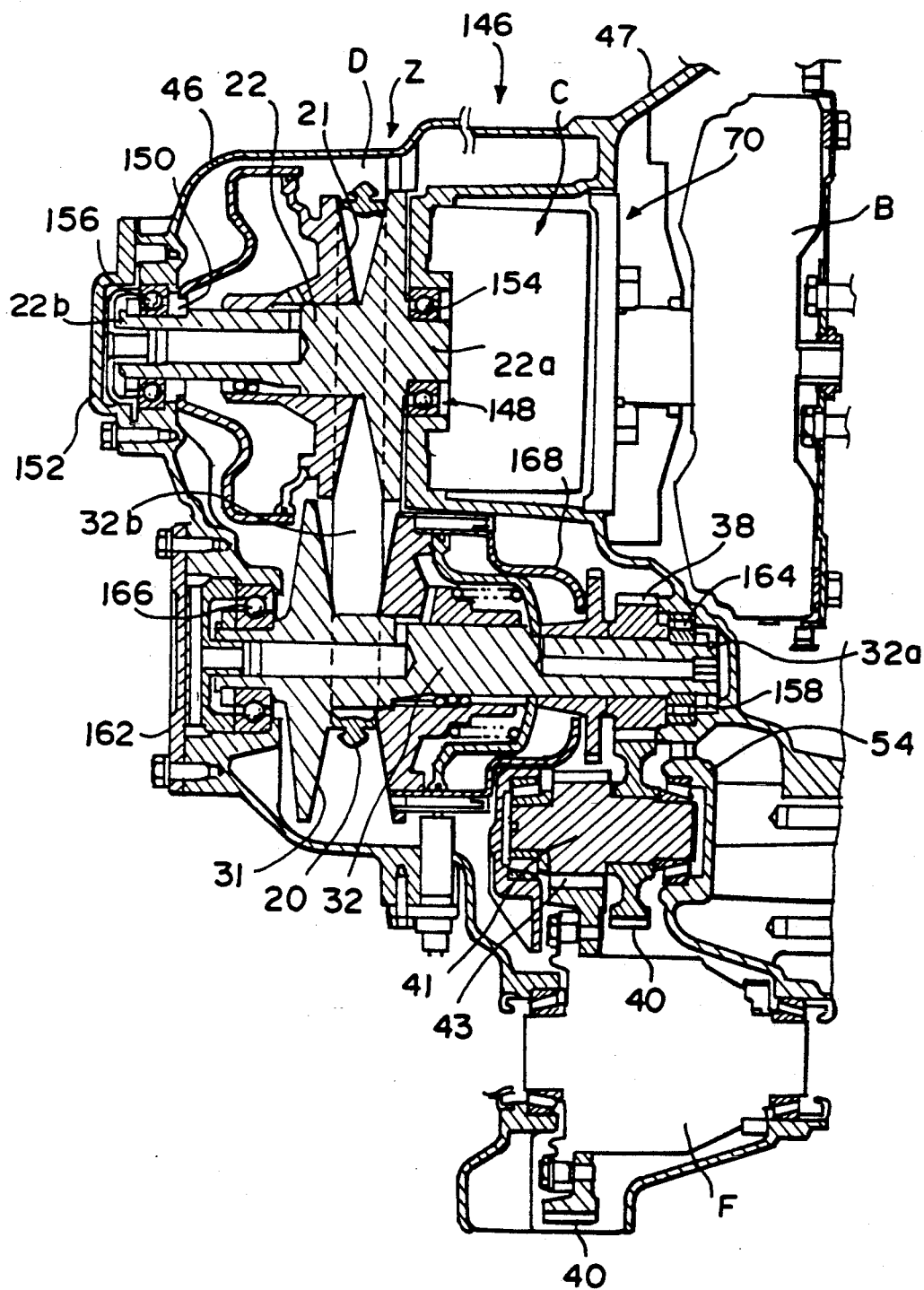
FIG. 2 is a fragmentary cross-sectional view of an automatic transmission system in accordance with an embodiment of the present invention.

The automatic transmission system Z of this embodiment is housed in a transmission casing 146 as shown in FIG. 2. The transmission casing 146 comprises an infinitely variable gear housing portion 46 and a torque convertor housing portion 47 which are mated together. The infinitely variable gear D is received in the infinitely variable gear housing portion 46 and the torque convertor B and the forward-reverse switching mechanism C are received in the torque convertor housing portion 47. The reduction gear E and the differential F are disposed between the infinitely variable gear housing portion 46 and the torque convertor housing portion 47 and are received partly in the former and partly in the latter. The forward-reverse switching mechanism C is received in a recess 70 formed in the torque convertor housing portion 47 which has a high rigidity and is fixed therein. The primary and secondary shafts 22 and 32 of the infinitely variable gear D are supported on the infinitely variable gear housing portion 46 at their one ends and on the torque convertor housing portion 47 at their other ends.

More particularly, the torque convertor housing portion 47 is provided with an opening 148 in the side facing the infinitely variable gear housing portion 46 and the infinitely variable gear housing portion 46 is provided with an opening 150 in the side remote from the torque convertor housing portion 47. The primary shaft 22 of the infinitely variable gear D is inserted through the opening 150 of the infinitely variable gear housing portion 46 so that the end portion 22a to be connected to the forward-reverse switching mechanism C extends into the torque convertor housing portion 47 through the opening 148. A cover 152 closes the opening 150 from outside. The primary shaft 22 is supported for rotation at opposite ends 22a and 22b on bearings 154 and 156 which are respectively provided in the openings 148 and 150.

The torque convertor housing portion 47 is provided with a recess 158 and the end portion 32a of the secondary shaft 32 of the infinitely variable gear D is inserted into the recess 158 with a large clearance therebetween. The infinitely variable gear housing portion 46 is provided with an opening 160, and the secondary shaft 32 is inserted through the opening 160 so that the portion 32a extends into the recess 158. A cover 162 closes the opening 160 from outside. The end portion 32a of the secondary shaft 32 is supported for rotation by a bearing 164 provided in the recess 158 and the end portion 32b of the secondary shaft 32 is supported for rotation by a bearing 166 provided in the opening 160. The gear 38 as well as the secondary pulley 31 is provided on the secondary shaft 32 on the side of the recess 158 facing the infinitely variable gear housing portion 46. Reference numeral 168 denotes a partition member which separates the space in which the gears 38 and 40 are positioned from the space in which the infinitely variable gear D is positioned. The partition member 168 need not support the secondary shaft 32.

As can be understood from the description above, in this embodiment, the transmission casing 146 is formed of the torque convertor housing portion 47 and the the infinitely variable gear housing portion 46 and the primary and secondary shafts 22 and 32 of the infinitely variable gear D are supported only on the housing portions 46 and 47. Accordingly, in order to position the shafts 22 and 32 with a high accuracy, only the torque convertor housing portion 47 and the infinitely variable gear housing portion 46 must be incorporated rigidly and accurately, which improves facility in incorporating the transmission casing 146.

Further, since the end portion 32a of the secondary shaft 32 is supported at its extreme end outside the gear 38, the secondary shaft 32 can be incorporated with the secondary pulley 31 and the gear 38 mounted thereon, whereby facility in incorporating the secondary shaft 32 is improved.

Further, since the secondary shaft 32 is directly supported on the torque convertor housing portion 47, the secondary shaft 32 can be easily positioned relative to the primary shaft 22 with a high accuracy.

Further since the secondary shaft 32 is supported at its extreme ends and the secondary pulley 31 and the gear 38 are mounted on intermediate portions of the secondary shaft 32, the secondary shaft 32 can be stably supported as compared with in the conventional system where the end portion of the secondary shaft 32 is supported in a cantilever fashion.

Further since the forward-reverse switching mechanism C is provided between the primary shaft 22 and the torque convertor B and is supported by the torque convertor housing portion 47 which is more rigid than the secondary shaft 32, the forward-reverse switching mechanism C can be positioned with a high accuracy relative the parts to be associated therewith as compared with in the conventional system where the forward-reverse switching mechanism C is mounted on the secondary shaft 32.

Figure 3:
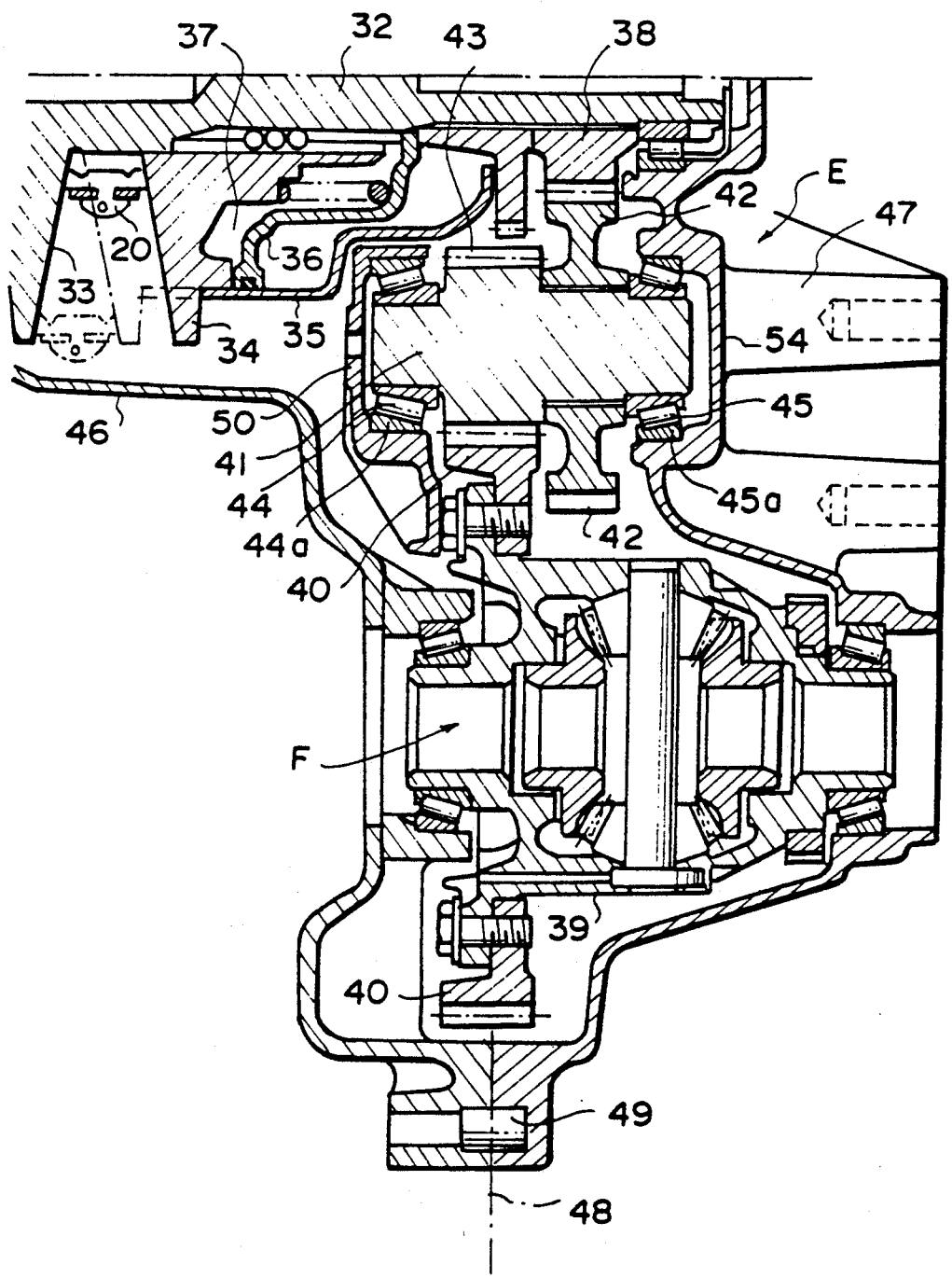
FIG. 3 is an enlarged view showing in more detail a part of the automatic transmission system shown in FIG. 2.

FIG. 3 shows in more detail the part of the automatic transmission system Z lower than the longitudinal axis of the secondary shaft 32.

As clearly shown in FIG. 3, the housings 46 and 47 are positioned relative to each other by a knock pin 49 and are mated along a vertical plane 48.

The second reduction gear 43 which is the smallest in the gears are formed integrally with the reduction gear shaft 41 and the first reduction gear 42 is connected to the reduction gear shaft 41 by way of splines to rotate together therewith. The left end of the reduction gear shaft 41 is supported for rotation on a bearing cover 50 by way of a bearing 44. The right end of the reduction gear shaft 41 is supported for rotation on the torque convertor housing portion 47 by way of a bearing 45.

Figure 5:
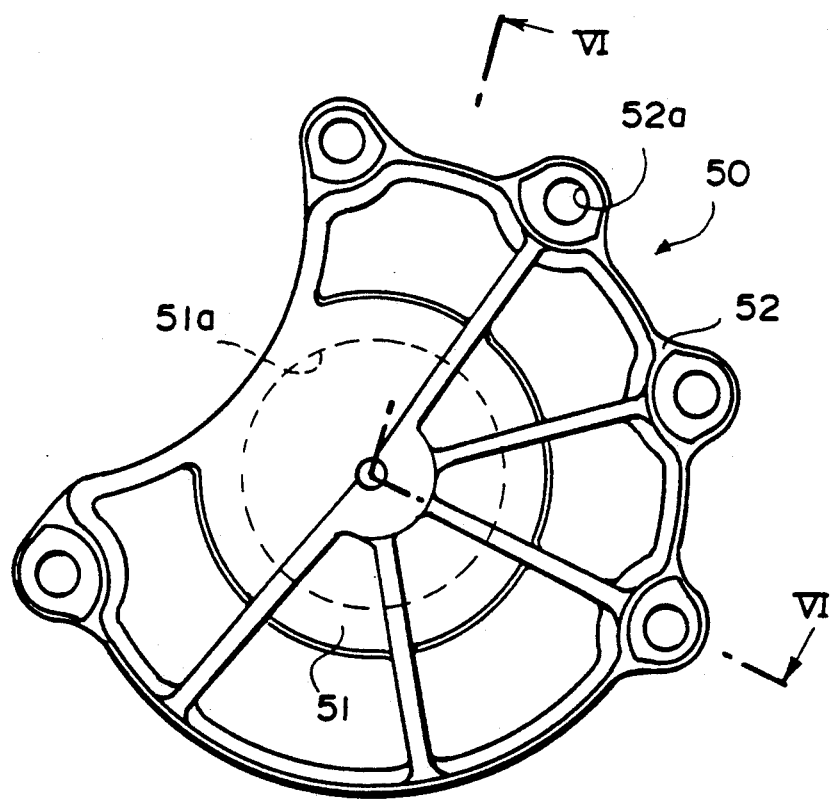
FIG. 5 is a rear side view of the bearing cover.
Figure 6:
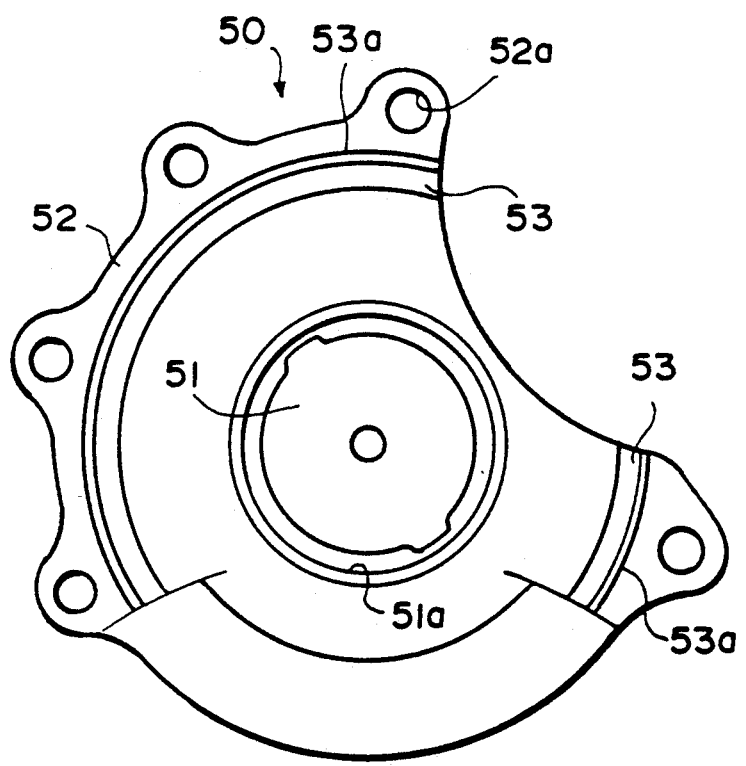
FIG. 6 is a front view of the bearing cover.
Figure 7:
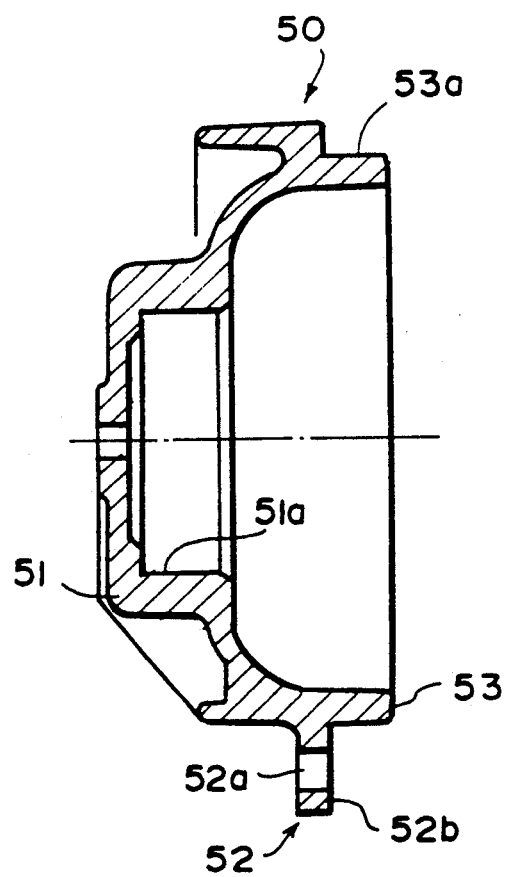
FIG. 7 is a cross-sectional view taken along line VII—VII in FIG. 5.

As shown in FIGS. 5 to 7, the bearing cover 50 comprises a bearing support portion 51 having an inner peripheral surface 51a in which an outer race 44a of the bearing 44 is fitted, a flange 52 having bolt holes 52a for bolting the bearing cover 50 to the torque convertor housing portion 47, and arcuate protrusions 53 which projects toward the torque convertor housing portion 47 from the surface 52b of the flange 52. The outer peripheral surfaces 53a of the protrusions 53 and the inner peripheral surface 51a of the bearing support portion 51 are coaxially formed by simultaneous work.

Figure 4:
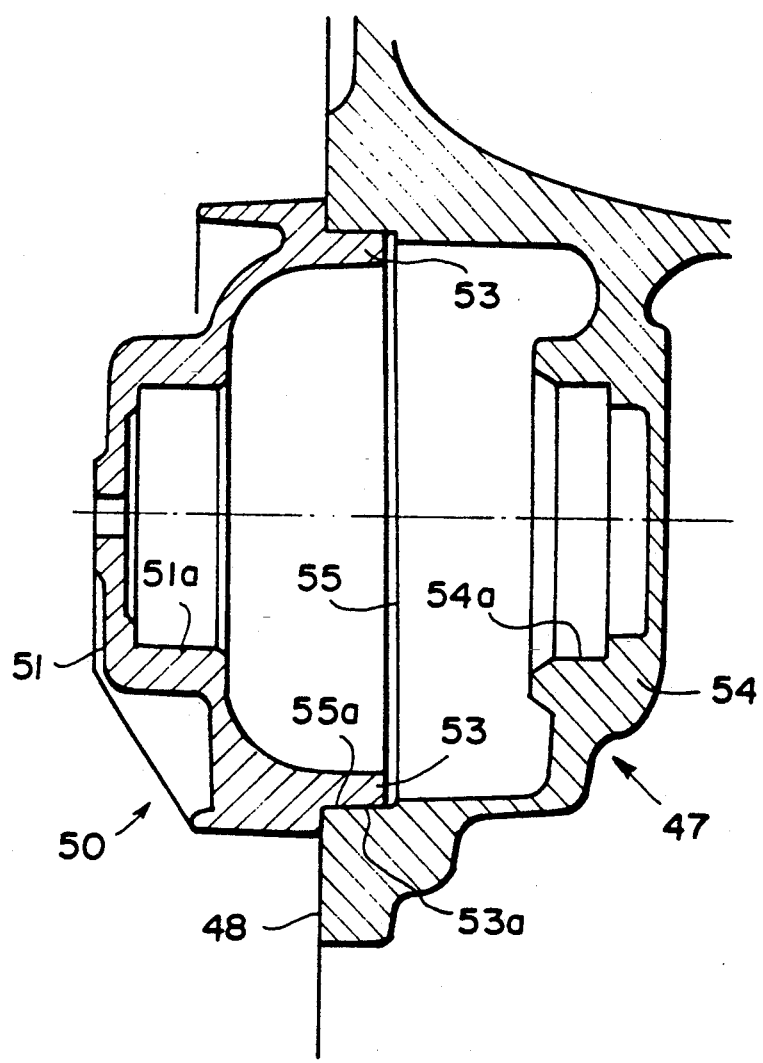
FIG. 4 is an enlarged view showing in more detail a part of FIG. 3.

Further, as shown in FIG. 4, the torque convertor housing portion 47 is provided with a bearing support portion 54 having an inner peripheral surface 54a in which an outer race 45a of the bearing 45 is fitted and an annular recess 55 which receives the protrusions 53 of the bearing cover 50. The inner peripheral surface 55a of the annular recess 55 is so sized that the outer peripheral surfaces 53a of the protrusions 53 of the bearing cover 50 is fitted in the inner peripheral surface 55a of the annular recess 55 in a socket joint fashion. The inner peripheral surface 55a of the annular recess 55 and the inner peripheral surface 54a of the bearing support portion 54 are formed by simultaneous work together with the outer peripheral surfaces 53a of the protrusions 53 and the inner peripheral surface 51a of the bearing support portion 51 of the bearing cover 50.

Thus in this embodiment, the bearing cover 50 is positioned so that the inner peripheral surfaces 51a and 54a of the bearing support portions 51 and 54 are centered with respect to each other by fitting the protrusions 53 of the bearing cover 50 in the annular recess 55 of the torque convertor housing portion 47 in a socket joint fashion, whereby the bearings 44 and 45 supporting opposite ends of the reduction gear shaft 41 are precisely centered relative to each other and gear noise produced in response to rotation of the shaft 41 is suppressed.

Though, in this embodiment, the structure for supporting the reduction gear shaft is applied to the automatic transmission system having a belt type infinitely variable gear, the structure may be employed in other various automatic transmission system having a reduction gear.

What is claimed is:

1. An automatic transmission system for a vehicle comprising a torque convertor; a forward-reverse switching mechanism; an infinitely variable gear having a primary pulley mounted on a primary shaft, a secondary pulley mounted on a secondary shaft and a belt passed around the primary and secondary pulleys; and a reduction gear having reduction gears mounted on a reduction gear shaft, these components being housed in a transmission casing, wherein said transmission casing comprises a torque converter housing portion in which the torque converter is housed and an infinitely variable gear housing portion which is formed separately from the torque convertor housing portion and in which the infinitely variable gear is housed, said forward-reverse switching mechanism is provided between the torque convertor and the primary shaft of the infinitely variable gear and is supported on a support portion integrally-formed in the torque converter housing portion, opposite ends of the primary shaft of the infinitely variable gear are supported on support portions respectively integrally-formed in the infinitely variable gear housing portion and the torque convertor housing portion, and opposite ends of the secondary shaft of the infinitely variable gear are supported on support portions respectively integrally-formed in the infinitely variable gear housing portion and the torque convertor housing portion.

2. An automatic transmission system as defined in claim 1 in which one end of said reduction gear shaft is supported on a bearing cover disposed in the infinitely variable gear housing portion and the other end of the reduction gear shaft is supported on a support portion formed in the torque convertor housing portion, said bearing cover being formed separately from the infinitely variable gear housing portion and being positioned relative to the torque convertor housing portion by way of engagement of a pair of engaging portions which are respectively formed in the bearing cover and the torque convertor housing portion so that the bearing cover and the support potion are centered relative to each other when the engaging portions are engaged with each other.

3. An automatic transmission system as defined in claim 2 in which said engaging portions are in the form of portions which are engaged with each other in a socket joint fashion, and the engaging portions are formed by simultaneous work together with the bearing cover and the support portion.

4. An automatic transmission system as defined in claim 1 in which said forward-reverse switching mechanism is disposed between the torque convertor and the support portion of the primary shaft of the infinitely variable gear formed in the torque convertor housing portion.

5. A reduction gear shaft supporting structure for a reduction gear which reduces the speed of an output shaft of an automatic transmission housed in a transmission casing which comprises a torque convertor housing portion in which a torque convertor is housed and a transmission mechanism housing portion in which a transmission mechanism is housed, characterized in that one end of said reduction gear shaft is supported on a bearing cover disposed in the transmission mechanism housing portion and the other end of the reduction gear shaft is supported on a support portion formed in the torque convertor housing portion, said bearing cover being formed separately from the transmission mechanism housing portion and being positioned relative to the torque convertor housing portion by way of engagement of a pair of engaging portions which are respectively formed in the bearing cover and the torque convertor housing portion so that the bearing cover and the support potion are centered relative to each other when the engaging portions are engaged with each other.

6. A reduction gear shaft supporting structure as defined in claim 5 in which said engaging portions are in the form of portions which are engaged with each other in a socket joint fashion, and the engaging portions are formed by simultaneous work together with the bearing cover and the support portion.

7. A reduction gear shaft supporting structure as defined in claim 6 in which said transmission mechanism is an infinitely variable gear having a primary pulley mounted on a primary shaft, a secondary pulley mounted on a secondary shaft and a belt passed around the primary and secondary pulleys.

8. An automatic transmission system as defined in claim 1 wherein one of the reduction gears is mounted on the secondary shaft between the support portions on which the opposite ends of the secondary shaft are supported.

* * * * *